United States Patent [19]

Jaskiery

[11] Patent Number: 5,558,407
[45] Date of Patent: *Sep. 24, 1996

[54] ALUMINUM FULL FACE VEHICLE WHEEL

[75] Inventor: Dennis Jaskiery, Milford, Mich.

[73] Assignee: Hayes Wheels International, Inc., Romulus, Mich.

[ * ] Notice: The term of this patent shall not extend beyond the expiration date of Pat. No. 5,435,633.

[21] Appl. No.: 505,141

[22] Filed: Jul. 21, 1995

Related U.S. Application Data

[63] Continuation of Ser. No. 176,587, Jan. 3, 1994, Pat. No. 5,435,633.

[51] Int. Cl.$^6$ ...................................................... B60B 3/04
[52] U.S. Cl. .............................................. 301/63.1; 301/95
[58] Field of Search ................................ 301/63.1, 65, 95, 301/97

[56] References Cited

U.S. PATENT DOCUMENTS

| | | | |
|---|---|---|---|
| 3,874,736 | 4/1975 | Anderson et al. | 301/63.1 |
| 4,610,482 | 9/1986 | Overbeck et al. | 301/63.1 |
| 5,188,429 | 2/1993 | Heck et al. | 301/63.1 |
| 5,435,632 | 7/1995 | Gajor et al. | 301/63.1 |

FOREIGN PATENT DOCUMENTS

| | | | |
|---|---|---|---|
| 505879 | 9/1992 | European Pat. Off. . | |
| 4018474 | 12/1991 | Germany . | |
| 0067106 | 4/1984 | Japan | 301/65 |
| 4305388 | 10/1992 | Japan . | |
| 5058106 | 3/1993 | Japan | 301/63.1 |
| 1403374 | 8/1975 | United Kingdom | 301/63.1 |

Primary Examiner—Russell D. Stormer
Attorney, Agent, or Firm—MacMillan, Sobanski & Todd

[57] ABSTRACT

An improved aluminum full face vehicle wheel is disclosed wherein the associated rim includes a uniquely shaped outboard tire bead seat which facilitates the welding of the rim to the associated wheel disc. In particular, the rim includes an axially extending outboard tire bead seat which terminates at a axial endmost surface. The axial endmost surface includes a radially extending first end surface, and a non-radially extending chamfered second end surface. When the axial endmost surface of the rim is positioned against an outboard tire bead seat retaining flange of the disc, the radially extending first end surface of the rim abuts the outboard tire bead seat retaining flange of the disc, and the non-radially extending chamfered second end surface of the rim is spaced from the outboard tire bead seat retaining flange of the disc to form a generally annular groove. The groove receives a weld to join the rim and the disc together and produce the finished aluminum full face vehicle wheel.

5 Claims, 2 Drawing Sheets

ALUMINUM FULL FACE VEHICLE WHEEL

This is a continuation of application Ser. No. 08/176,587 filed on Jan. 3, 1994 and now U.S. Pat. No. 5,435,633.

BACKGROUND OF THE INVENTION

This invention relates in general to a vehicle wheel and, in particular, to an improved aluminum full face vehicle wheel.

A full face vehicle wheel includes a "full face" disc and a "partial" rim which are joined together during a welding operation. The associated disc can be cast, forged, or fabricated from aluminum or steel, and the associated rim is fabricated from aluminum or steel.

One example of a full face vehicle wheel having a fabricated steel disc and rim is disclosed in U.S. Pat. No. 4,610,482 to Overbeck et al, and is shown in attached prior art FIG. 4. As shown therein, the end of an outboard bead seat 60 of a steel rim is provided with a radially in-turned flange 62. The in-turned flange 62 is machined to provide an axially extending surface 64, a radially inwardly sloping surface 66, and a radially extending surface 68. The radially inwardly sloping surface 66 cooperates with an inner surface 70A of the outboard tire bead seat retaining flange 70 of the disc to form a joint. A weld 72 is deposited in the joint to join the rim and disc together.

Other examples of full face wheels are disclosed in U.S. Pat. No. 5,027,508 to Cissell II, and U.S. Pat. No. 3,506,311 to Nobach.

SUMMARY OF THE INVENTION

For similarly sized aluminum and steel wheels, the thickness of an aluminum rim in the region of the outboard tire bead seat is approximately double the thickness of that of a steel rim. Applicant has discovered for full face applications this increased thickness presents certain problems. For example, because it is very difficult to turn the outboard tire bead seat of the aluminum rim radially inwardly, the teachings of the above-discussed Overbeck et al. patent cannot be effectively used. This invention concerns an improved aluminum full face vehicle wheel wherein the associated rim includes a uniquely shaped outboard tire bead seat which facilitates the welding of the rim to the associated wheel disc.

In particular, the full face vehicle wheel of this invention includes an annular disc and a circular rim. The disc is constructed of cast, forged, or fabricated aluminum and includes a body having a centrally located wheel mounting surface and an outer annular portion. The outer annular portion defines an outboard tire bead seat retaining flange of the full face wheel. The rim is also constructed of aluminum and defines an axis and includes an inboard tire bead seat retaining flange, an inboard tire bead seat, an axially extending well, and an axially extending outboard tire bead seat. The outboard tire bead seat is of a substantially uniform thickness, and terminates at an axial endmost surface. The axial endmost surface includes a radially extending first end surface, and a non-radially extending chamfered second end surface.

When the axial endmost surface of the rim is positioned against the outboard tire bead seat retaining flange of the disc, the radially extending first end surface of the rim abuts the outboard tire bead seat retaining flange of the disc, and the non-radially extending chamfered second end surface of the rim is spaced from the outboard tire bead seat retaining flange of the disc to form a generally annular groove. The groove receives a weld to join the rim and the disc together and produce the finished aluminum full face vehicle wheel.

The groove formed between the chamfered second end surface of the rim and the outboard tire bead seat retaining flange of the disc is specifically dimensioned to enable sufficient weld penetration into the rim and disc. In addition, the groove is effective to recess the weld from an associated tire bead bundle.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
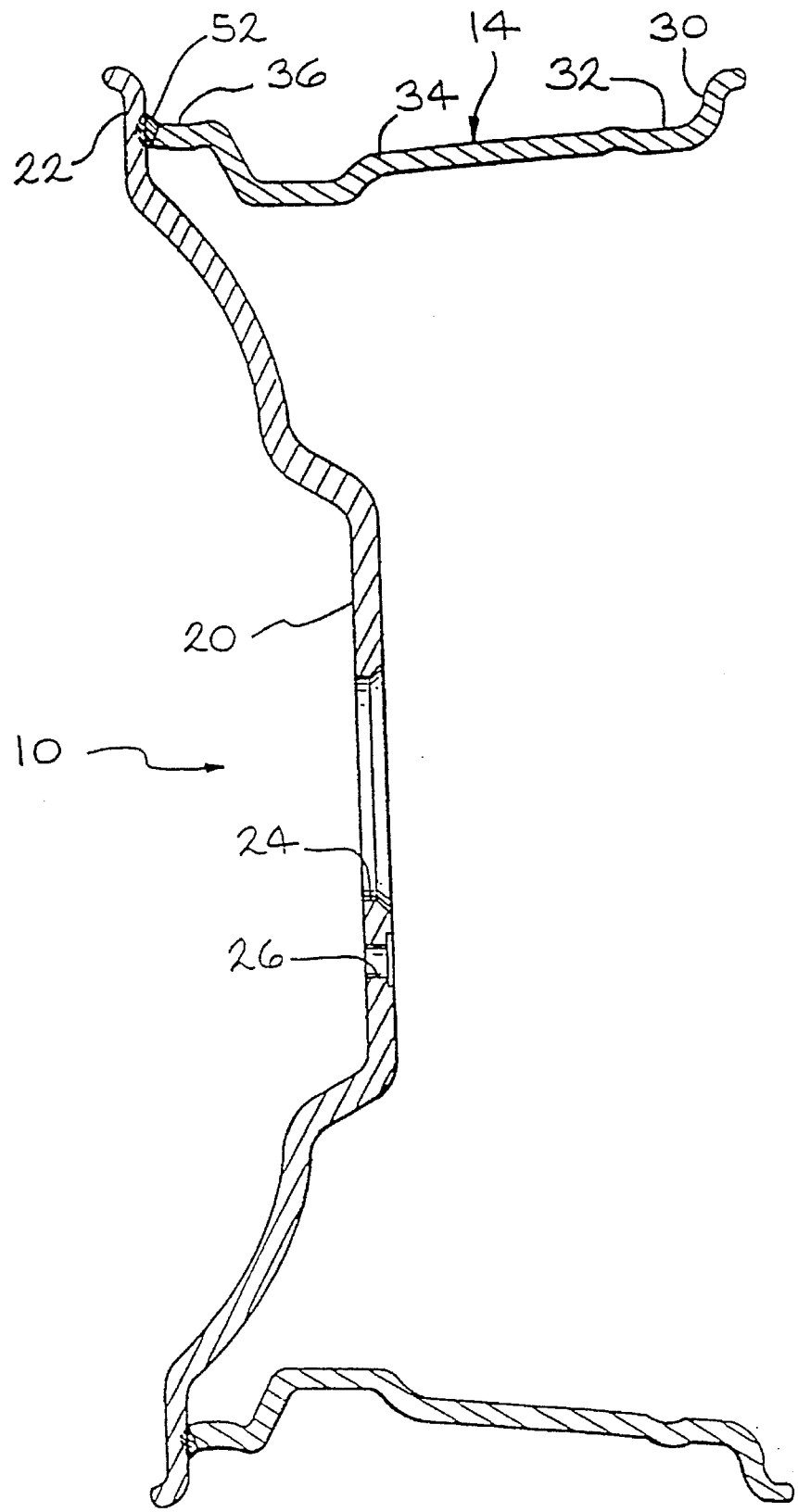
FIG. 1 is a front plan view of an aluminum full face fabricated vehicle wheel constructed in accordance with the present invention.

Referring now to the drawings, there is illustrated in FIG. 1 a full face vehicle wheel, indicated generally at 10, and constructed in accordance with the present invention. The full face vehicle wheel 10 includes a disc 12 and rim 14 which are joined together during a welding operation.

The disc 12 is a formed, forged, or cast disc constructed of aluminum and includes a generally centrally located wheel mounting surface 20, and an outer annular flange 22. The wheel mounting surface 20 is provided with a centrally located pilot aperture 24. A plurality of equally spaced lug mounting apertures 26 (only one is shown), are spaced equidistantly from the pilot aperture 24. The lug mounting apertures 26 receive lug bolts and nuts (not shown) for securing the wheel 10 on an axle (not shown) of a vehicle. As will be discussed below, the outer annular flange 22 of the disc 12 defines an outboard tire bead seat retaining flange of the finished full face wheel 10.

The rim 14 is also constructed of aluminum includes an inboard tire bead seat retaining flange 30, an inboard tire bead seat 32, a generally axially extending well 34, and an outboard tire bead seat 36.

Figure 2:
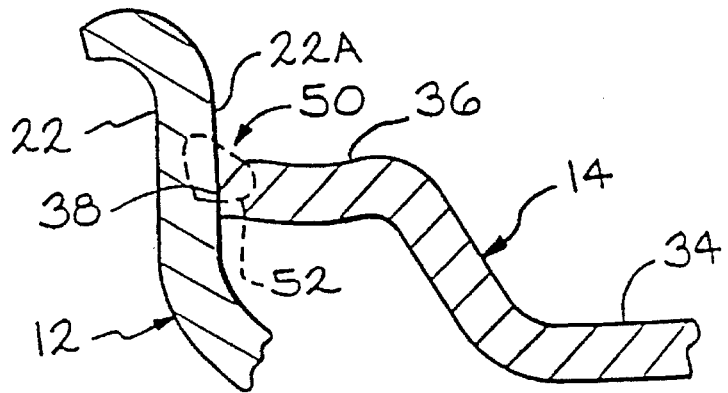
FIG. 2 is an enlarged cross sectional view of a selected portion of FIG. 1, and showing a weld joint geometry for joining the disc to the rim to produce the full face vehicle wheel.

As best shown in FIG. 2, the outboard tire bead seat 36 of the rim 14 includes an outer axially extending cylindrical surface 40 and an inner axially extending cylindrical surface 42 which is substantially parallel to the outer cylindrical surface 40 to define a generally constant thickness T throughout the entire length of the outboard tire bead seat 36. Typically, the thickness T of the rim 14 in the region of the outboard tire bead seat 36 is in the range of 0.250 inch to 0.275 inch.

Figure 3:
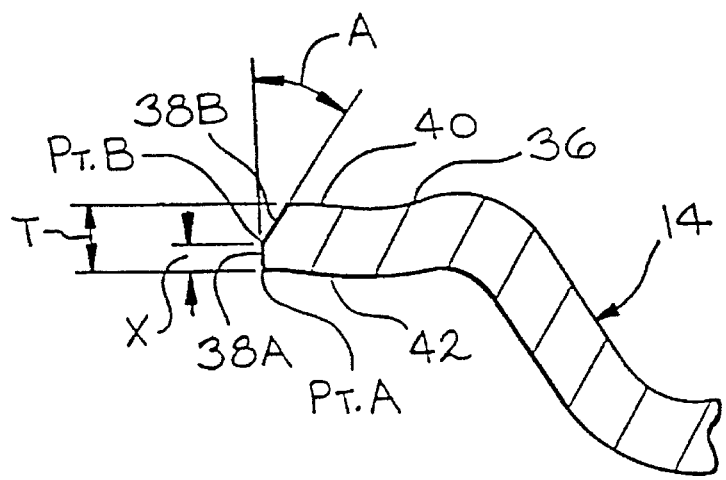
FIG. 3 is an enlarged cross sectional view of the outboard end of the rim shown in FIG. 2.
Figure 4:
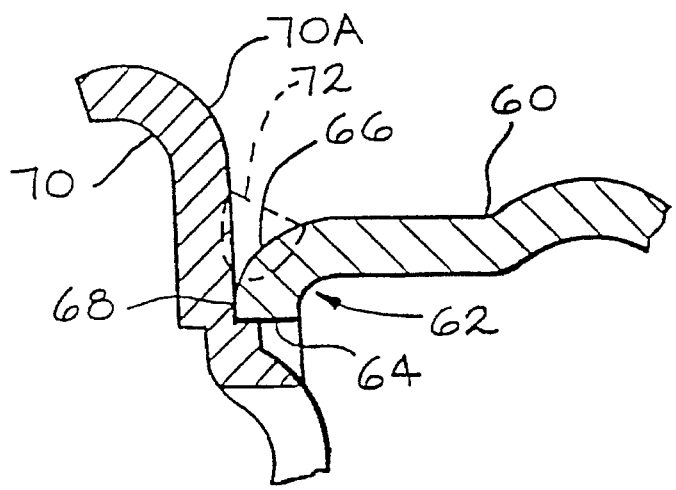
FIG. 4 is a view similar to FIG. 2, and showing a weld joint geometry for use in producing a prior art full face vehicle wheel.

The outboard tire bead seat 36 terminates at an axial endmost surface 38. As best shown in FIG. 3, the axial endmost surface 38 includes a radially extending first end surface 38A, and a non-radially extending chamfered second end surface 38B. The radially extending first end surface 38A extends from a point A to a point B to define a radial distance X. As will be discussed below, the non-radially extending chamfered second end surface 38B is preferably formed during a subsequent machining operation in order to maintain tight tolerances.

To assemble the full face wheel 10, the axial endmost surface 38 of the rim 14 is positioned against the outboard tire bead seat retaining flange 22 of the disc 12. In this position, the first end surface 38A of the rim 14 abuts a radially extending inner surface 22A of the outboard tire bead seat retaining flange 22 of the disc 12, and the chamfered second end surface 38B is spaced from the inner surface 22A thereby forming a recess, indicated generally at 50, between the chamfered second end surface 38B and the outboard bead seat retaining flange 22 of the disc 12. The recess 50 defines an annular groove which receives a circumferential weld 52 for joining the rim 14 and disc 12 together to produce the finished aluminum full face vehicle wheel 10.

Since the dimension of the recess 50 is determined by the particular angle of the chamfered second end surface 38B and the radial distance X of the first end surface 38A, a predetermined dimensioned recess 50 can be provided to ensure that the weld 52 sufficiently penetrates into the rim 14 and the disc 12. In particular, the radial distance X of the first end surface 38A, and the angle of the chamfered second end surface 38B are predetermined to produce a recess 50 which enables the weld 52 to penetrate at least 60% into the rim 14.

In order to provide a weld penetration of at least 60%, the radial distance X of the first end surface 38A of the rim is preferably less than 0.060 inch or approximately 25% the thickness T of the rim 14 in the region of the outboard tire bead seat 36, and an angle A of the chamfered second end surface 38B relative to the first end surface 38A is preferably at least 35°. For example, in an aluminum rim 14 having a thickness T in the region of the outboard tire bead seat 36 in the range of 0.250 inch to 0.275 inch, the radial distance X of the first end surface 38A is in the range of 0.050 inch to 0.075 inch, and the angle of the chamfer of the second end surface 38B is between 30° to 40°.

One advantage of the present invention is that the chamfered second end surface 38B of the rim 14 can be machined to provide a specifically dimensioned groove 50 to ensure that the weld 52 sufficiently penetrates into the rim 14 and the disc 12. Another advantage of the present invention is that the groove 50 is effective to recess the weld 52 from an associated tire bead bundle (not shown). As a result of this, "fretting" of the tire by the weld is prevented. Fretting is defined as the wearing of the tire material caused by the rubbing of the tire against the weld. It is important to prevent fretting from occurring since it can cut and damage the tire and lead to a loss of pressure in the tire.

In accordance with the provisions of the patent statutes, the principle and mode of operation of this invention have been described and illustrated in its preferred embodiment.

However, it must be understood that the invention may be practiced otherwise than as specifically explained and illustrated without departing from the spirit or scope of the attached claims.

What is claimed:

1. A full face vehicle wheel comprising:

a generally annular disc constructed of aluminum and including a body having a centrally located wheel mounting surface and an outer annular portion, said outer annular portion defining an outboard tire bead seat retaining flange of the full face wheel, said outboard tire bead seat retaining flange defining a radially extending inner surface;

a generally circular rim constructed of aluminum and defining an axis and including an inboard tire bead seat retaining flange, an inboard tire bead seat, an axially extending well, and an outboard tire bead seat;

said outboard tire bead seat being of a substantially uniform thickness and defining generally parallel outer and inner axially extending cylindrical surfaces which terminate at an axial endmost surface, said axial endmost surface including a radially extending first end surface and a non-radially extending chamfered second end surface;

wherein when said axial endmost surface of said rim is positioned adjacent said outboard tire bead seat retaining flange of said disc, said radially extending first end surface of said rim abuts said radially extending inner surface of said outboard tire bead seat retaining flange of said disc, and said non-radially extending chamfered second end surface of said rim is spaced from and cooperates with said radially extending inner surface of said outboard tire bead seat retaining flange of said disc to form a generally annular groove for receiving a weld to join said rim and said disc together and produce the finish full face wheel.

2. The full face vehicle wheel defined in claim 1 wherein said radially extending first end surface extends radially a distance less than 50% said thickness of said outboard tire bead seat.

3. The full face vehicle wheel defined in claim 1 wherein said radially extending first end surface extends radially a distance of approximately 25% said thickness of said outboard tire bead seat.

4. The full face vehicle wheel defined in claim 1 wherein said non-radially extending chamfered second end surface is at an angle in the range of 25° to 45° relative to said first end surface.

5. The full face vehicle wheel defined in claim 1 wherein said non-radially extending chamfered second end surface is at an angle of approximately 35° relative to said first end surface.

\* \* \* \* \*